United States Patent Office 3,417,172
Patented Dec. 17, 1968

3,417,172
METHOD OF MAKING SYNTHETIC MARBLE
David Rostoker, Tioga, Pa., assignor to Corning Glass Works, Corning, N.Y., a corporation of New York
No Drawing. Filed Oct. 22, 1965, Ser. No. 502,573
7 Claims. (Cl. 264—77)

ABSTRACT OF THE DISCLOSURE

A method of making a synthetic marble product comprising pressing finely ground calcite particles in a carbon dioxide atmosphere at a temperature of 775–1000° C. and a pressure of 1,000–3,000 p.s.i. for a time sufficient to form a coherent body capable of taking a polish.

Optionally, chemically compatible coloring agents are added to the calcite particles to make colored synthetic marble.

---

This invention relates to a synthetic marble product and more particularly to a method of forming a synthetic marble product by uniting minute calcite particles.

Since ancient times, marble has been extensively used by man for building and ornamental purposes. This stone is well known for its beauty, durability, and color. For purposes of classification, there are two general classes of marbles; the calcite marbles which are almost pure calcium carbonate and the dolomite marbles which contain a high percent of magnesium carbonate. The term marble is applied commercially to either rock if it is capable of taking a polish.

Natural marbles are metamorphic rocks formed essentially from the recrystallization of limestone. In nature, limestone may become plastic under elevated pressures and high temperatures and over a long time interval, this plastic material subsequently solidifies and recrystallizes. However, marble, being a product of nature, is commonly inhomogeneous and may possess fractures and impurities that impair its dimensional stability. Marble can be cut and shaped to alter its physical appearance, but its physical properties, like its great beauty, are often nonuniform and unpredictable.

It has been known for many years that marble may be deformed plastically under high confining pressure and at room temperature. Research has been conducted on the mechanism of marble deformation by D. T. Griggs et al., and reported in a chapter entitled, Annealing Recrystallization in Calcitic Crystals and Aggregates, Rock Deformation, Geological Society of America Memoir 79, pages 21–38. The behavior of calcite and marble at temperatures of several hundred degrees and confining pressures of a few thousand atmospheres has been suggested to be similar to that of a ductile metal at atmospheric pressure. Griggs deformed powdered marble at room temperature to a degree where strain hardening occurred. Such deformation at temperatures, low enough to permit noticeable strain hardening without recrystallization is similar to metallurgical "cold working," as contrasted with "hot working" at temperatures high enough for new crystals to nucleate at the expense of the strained crystals. He subsequently heated the deformed material to a point of annealing recrystallization. It was also demonstrated that recrystallization due to shear strain designated as "syntectonic recrystallization," produced a fabric of highly preferred orientation. In these experiments Griggs used pressures of 5 kilobars (72,000 p.s.i.) or greater for most of his work. Unfortunately, the conditions necessary to produce Griggs' product are not commercially practical.

It is therefore an object of the present invention to manufacture a synthetic marble product, essentially indistinguishable in appearance from the natural product.

It is a further object of the present invention to provide a method of making a marble product which can be formed at a commercially feasible scale using standard equipment.

It is another object of the present invention to provide a synthetic marble product having various colors and textures.

In accordance with the present invention, I have discovered a method of making a marble product which is capable of taking a polish by grinding, in a carbon dioxide atmosphere calcite having a minimum purity of 98% calcium carbonate to a particle size of less than 375 mesh and pressing the calcite particles in a carbon dioxide atmosphere at a sufficient temperature and corresponding pressure for a time sufficient for a coherent body to form. When made in the shape of a boule, the resulting marble can be cut into slabs, and thereafter polished according to the conventional procedures used for natural marble. The product is comparable in aesthetic appearance to the natural stone, and exhibits strength and impact resistance values in excess of many natural marbles.

The marble prepared according to the present invention has numerous advantages over natural marble. To a large extent these are associated with the fact that the texture, quality, color, and dimensional size can be controlled and are not subject to the vagaries of nature.

The raw material used in the present invention is finely ground crystalline calcite marble which must be at least 98% pure calcium carbonate. Such high quality marble is commercially available and a particularly good source is Yule marble from Colorado. In order to achieve various textural effects, the marble can be ground and separated into coarse and fine fractions. The coarse fractions generally range from 10 to 30 mesh (U.S. sieve size) and the fine particles should be below 375 mesh. The charge is carefully mixed with preferably greater than 50% of the fine fraction, although the highest concentration of coarse material most enhances the aesthetic appearance of the marble product. It was found that precipitated calcium carbonate could not be used as fine feed since it tended to calcine too readily under the operating conditions.

Even the ground calcite particles will calcine at the high temperatures required unless a carbon dioxide atmosphere is present. Outgassing and heating a large amount of fine powder in the pressing die can be a serious obstacle to efficient production. This obstacle may be overcome by using a carbon dioxide atmosphere during the grinding stage. Thereafter the ground material, heated somewhat during the grinding procedure, is further heated in hot pipe as it is blown with carbon dioxide into the die. A major advantage of this is that all of the fresh surfaces created during the grinding absorb carbon dioxide thus eliminating the necessity for subsequent outgassing.

The pressing step involves receiving the ground calcite particles and subjecting them to conditions of temperature and pressure for a sufficient time to form a coherent marble body. The primary variables are the temperature, pressure, and time. We have found that the tempeature, pressure, and time. We have found that the temperature range required is from 775 to 1,000° C. At temperatures below 775° C., the calcite crystals usually do not become sufficiently plastic to form a coherent body, whereas at temperatures above 1,000° C. it becomes extremely difficult to suppress calcination. The corresponding pressure range to the temperature is between 1,000 and 3,000 p.s.i.

above which recrystallization may occur resulting in an undesirable decrease in strength properties.

Under these low pressures it is possible to use commercially available die materials such as nickel-base alloy.

The hot pressing of the calcite must be preformed in the presence of a carbon dioxide atmosphere to avoid calcination. In the absence of a carbon dioxide atmosphere, the decomposition range for calcium carbonate in high calcium limestones and marbles is largely between 830 to 905° C. i.e. the temperature at which the equilibrium decomposition pressure of carbon dioxide is one atmosphere. The time required to produce a coherent marble body is generally from 10 to 120 minutes and longer periods can, of course, be used. It is generally preferred to press the calcite particles for at least 60 minutes.

After the formed synthetic marble body is cooled and removed from the press, it is subjected to the final finishing operation. This involves cutting the marble to the proper dimensions and polishing the surface to the final depth of reflection using conventional techniques. The marble product obtained by the above procedure is a pure white marble which is most highly prized for architectural veneers.

In another embodiment of my invention, I have discovered a process for making colored marble products which are generally uniformly colored or have colored streaks and swirls. The compatible coloring agent is added initially and mixed with the calcite particles and the mixture is pressed to form a colored coherent body. Useful coloring agents are inorganic compounds which are thermally stable or form thermally stable colors. As another requirement, the coloring agent must be non-reactive with calcium carbonate and chemically stable in the system. Substantially anhydrous compounds should be used as water evolving at the high operating temperatures and may act as a medium fore acid-base reactions. Oxidizing agents or compounds which decompose to form oxidizing agents under the forming conditions, such as halides, phosphates, sulfates, and sulfites, should be avoided. It is further important that the coloring agent be dispersible in the ground calcite without requiring addition of incompatible dispersing agents and that the coloring agent be non-leachable by water. Coloring agents which have been found particularly effective and useful in the present invention are the oxides or carbonates of metals having an atomic number of 24 to 29 and 82. These are the oxides and carbonates of chromium, manganese, iron, cobalt, nickel, copper, and lead. Particularly effective coloring agents are naturally occurring carbonates such as siderite and rhodochrosite. Generally the coloring agents are added in quantities from 2 to 5% by weight.

My invention is further illustrated by the following examples:

EXAMPLE I

Chips of marble from Yule, Colo., were ground in a tungsten carbide ball mill in a presence of a carbon dioxide atmosphere to a grain size of less than 10 microns. Inside a $CO_2$ containing glove bag, 50 grams of the powder were loosely placed into a 1¾ inch (inside diameter) molybdenum alloy die which had previously been coated with a protective alumina wash. A die plunger was inserted and the die and contents were transferred to a standard hot press.

While maintaining a positive carbon dioxide atmosphere, the die was heated to a temperature of 300° C. and a hydraulic pressure of 1,750 p.s.i. was applied. The die was then heated to a temperature of 800° C. The temperature and pressure were maintained for a period of about 60 minutes.

The sample was cooled, removed from the die, cut and polished. The product was a coherent body having a pure white color and exhibiting a "cold worked" texture, a density of 95% of theoretical, and a rupture strength of 4,000 p.s.i. No evidence of calcination was observed but some minor reaction was noticed at the periphery of the sample cause by contact with the alumina wash. The product obtained had appearance which was indistinguishable from naturally formed marble. A comparison in the strength properties of the synthetic marble as compared to natural marble is given below:

| | Synthetic Marble | Natural Marble |
|---|---|---|
| Rupture Strength (MOR) | 4,000 p.s.i. | 1,900 p.s.i. (av.). |
| Tensile Strength | 3,000 p.s.i. | 1,700 p.s.i. (av.). |

EXAMPLE II

Using a modification of the above procedure two hundred pounds of ground marble were placed in a cylindrical graphite die of 10 inch internal diameter and 48 inch in height. The body was outgassed and flushed with $CO_2$ at 300° C. Pressing was accomplished at 1,000° C. and 1,000 p.s.i. A coherent block of marble of a 10 inch diameter and 22 inch height was formed. After cutting and polishing the sample, it was observed that extreme calcination had taken place at the periphery of the body and there was minor calcination throughout.

Nevertheless an 8 inch diameter and a 2 inch thick slab was cut and polished and was relatively indistinguishable from natural marble. The calcination was interpreted as resulting from the effect of the graphite die. This experiment demonstrated that by using the process of the present invention, large blocks of marble could be produced.

EXAMPLE III

In order to determine the minimum temperature, the procedure of Example I was repeated and a sample of ground calcite was pressed at 750° C. under 5,000 p.s.i. and held for 6 hours. The resultant body exhibited no cohesion and was virtually a powder pack. This experiment showed that at a low temperature of 750° C. and even at greater pressures than used for the present invention and prolonged time, it was not possible to obtain a coherent body.

EXAMPLE IV

Following the procedure of Example I, a sample of ground calcite was pressed at 850° C. under a pressure of 3,000 p.s.i. The sample exhibited incipient recrystallization in the center that was similar to the recrystallization phenomena described by Griggs et al. as "syntectonic recrystallization." The synthetic marble product obtained was somewhat less desirable in physical properties than the preferred product in that the product exhibited a 90% density and a rupture strength (MOR) of 2,500 p.s.i.

EXAMPLE V

Example III was repeated at 850° C. and 1,000 p.s.i. The resultant sample did not evidence recrystallization. It possessed a density of 92% of theoretical and a rupture strength (MOR) of 3,500 p.s.i.

EXAMPLE VI (a) Further experiments were performed using ground Iceland spar (transparent calcite) which behaved in a fashion similar to Yule marble.

(b) Experiments performed using precipitated calcium carbonate were not successful due to the tendency of the material to calcine.

EXAMPLE VII

Following the above procedure of Example I, a swirl of ground siderite ($Fe_2CO_3$) was added to the batch. The resultant body exhibited a brown and white variegated color pattern. Similar a black variegated color was achieved using rhodochrosite ($MnCO_3$) and a red variegated color was achieved using copper carbonate.

The invention can be used to produce large block of highly pure, fracture-free, completely homogeneous marble for use as architectural veneers. These blocks may be sawed into sheets and polished with greater ease than the natural product due to the greater strength, homogeneity, and flaw-free character of the synthetic marble.

I claim:
1. A method of making a synthetic marble product which is capable of taking a polish comprising pressing calcite particles having a minimum purity of 98% calcium carbonate in the presence of a carbon dioxide atmosphere at a sufficient temperature of 775–1000° C. and a corresponding pressure of 1000–3000 p.s.i. to form a coherent marble body.

2. A method of making a synthetic marble product comprising the steps of:
   (a) placing a charge of pure ground calcite particles at least 50% of which having a grain size less than 375 mesh into a die;
   (b) flushing said die with a carbon dioxide atmosphere and maintaining a positive pressure of said atmosphere;
   (c) heating the charge under a uniform hydraulic pressure of 1000–3000 to an elevated temperature 775–1000° C. sufficient to cause the occurrence of plastic flow, and
   (d) cooling said charge to form a coherent marble body.

3. A method of making a synthetic marble product comprising the steps of:
   (a) grinding calcite having a minimum purity of 98% calcium carbonate to a particle size of less than 375 mesh,
   (b) pressing the calcite particles in a carbon dioxide atmosphere at a temperature of 775–1,000° C. and a pressure of 1,000 to 3,000 p.s.i. for a time of 10 to 120 minutes to form a coherent body, and
   (c) polishing said body to obtain the final marble product.

4. The method of claim 3, wherein a chemically compatible and thermally stable inorganic coloring agent is added to the calcite prior to said pressing.

5. The method of claim 4 wherein said compatible inorganic coloring agent is a carbonate or an oxide of a metal selected from the group consisting of chromium, manganese, iron, cobalt, nickel, copper, and lead.

6. The method of claim 4 wherein said compatible inorganic coloring agent is siderite.

7. The method of claim 4 wherein said compatible inorganic coloring agent is rhodochrosite.

References Cited

UNITED STATES PATENTS

| | | | |
|---|---|---|---|
| 78,327 | 5/1868 | Rowland | 264—122 |
| 687,079 | 11/1901 | Thom | 264—65 X |
| 3,196,193 | 7/1965 | Davies | 264—58 |

FOREIGN PATENTS

| | | |
|---|---|---|
| 481,706 | 3/1952 | Canada. |
| 16,296 | 7/1914 | Great Britain. |

ROBERT F. WHITE, *Primary Examiner.*

R. R. KUCIA, *Assistant Examiner.*

U.S. Cl. X.R.

264—65, 85, 125, 122